United States Patent
Kai et al.

(10) Patent No.: US 11,292,899 B2
(45) Date of Patent: Apr. 5, 2022

(54) PROPYLENE-BASED POLYMER, METHOD FOR PRODUCING THE SAME, PROPYLENE-BASED RESIN COMPOSITION AND MOLDED ARTICLE

(71) Applicants: MITSUI CHEMICALS, INC., Tokyo (JP); PRIME POLYMER CO., LTD., Tokyo (JP)

(72) Inventors: Yasuhiro Kai, Otake (JP); Naoya Noda, Yamaguchi (JP); Kenji Michiue, Otake (JP); Keita Itakura, Ichihara (JP)

(73) Assignees: MITSUI CHEMICALS, INC., Tokyo (JP); PRIME POLYMER CO., LTD., Tokyo (JP)

( * ) Notice: Subject to any disclaimer, the term of this patent is extended or adjusted under 35 U.S.C. 154(b) by 241 days.

(21) Appl. No.: 16/620,152

(22) PCT Filed: Jun. 29, 2018

(86) PCT No.: PCT/JP2018/024777
§ 371 (c)(1),
(2) Date: Dec. 6, 2019

(87) PCT Pub. No.: WO2019/004418
PCT Pub. Date: Jan. 3, 2019

(65) Prior Publication Data
US 2021/0147663 A1 May 20, 2021

(30) Foreign Application Priority Data
Jun. 30, 2017 (JP) .............................. JP2017-128735

(51) Int. Cl.
| | |
|---|---|
| C08F 10/06 | (2006.01) |
| C08F 210/06 | (2006.01) |
| C08F 210/16 | (2006.01) |
| C08L 23/12 | (2006.01) |
| C07F 7/28 | (2006.01) |
| C08F 110/06 | (2006.01) |

(52) U.S. Cl.
CPC .............. C08L 23/12 (2013.01); C07F 7/28 (2013.01); C08F 10/06 (2013.01); C08F 110/06 (2013.01); C08F 210/06 (2013.01); C08F 210/16 (2013.01); C08F 2500/15 (2013.01); C08F 2500/37 (2021.01); C08L 2205/025 (2013.01); C08L 2205/03 (2013.01); C08L 2205/24 (2013.01)

(58) Field of Classification Search
CPC ...... C08F 10/06; C08F 110/06; C08F 210/06; C08F 210/16; C08F 23/12; C08F 2500/15; C08F 2500/37
See application file for complete search history.

(56) References Cited

U.S. PATENT DOCUMENTS

| | | | | |
|---|---|---|---|---|
| 4,334,040 A | * | 6/1982 | Fujii | C08F 297/08 525/321 |
| 4,550,145 A | * | 10/1985 | Kasahara | C08F 297/086 525/247 |
| 4,841,004 A | * | 6/1989 | Kaminsky | C08F 10/00 526/160 |
| 4,952,649 A | | 8/1990 | Kioka et al. | |
| 4,971,936 A | * | 11/1990 | Wilson | C08F 10/08 502/124 |
| 5,597,881 A | * | 1/1997 | Winter | C08F 10/06 526/348 |
| 5,637,666 A | * | 6/1997 | Winter | C08L 23/10 526/351 |
| 5,684,173 A | | 11/1997 | Hosaka et al. | |
| 5,700,896 A | * | 12/1997 | Dolle | C08F 110/06 502/103 |
| 5,703,172 A | * | 12/1997 | Watanabe | C08L 53/00 525/323 |
| 5,916,990 A | * | 6/1999 | Yanagihara | C08F 10/00 526/351 |
| 6,143,686 A | * | 11/2000 | Vizzini | C08F 10/00 502/152 |

(Continued)

FOREIGN PATENT DOCUMENTS

| | | | |
|---|---|---|---|
| EP | 1 002 814 A1 | 5/2000 | |
| EP | 1 726 602 A1 * | 11/2006 | ............ C08F 110/06 |
| JP | S58-083006 A | 5/1983 | |
| JP | S59-124909 A | 7/1984 | |
| JP | H04-096911 A | 3/1992 | |

(Continued)

OTHER PUBLICATIONS

Busico et al., "Microstructure of polypropylene," 2001, Progress in Polymer Science, vol. 26, p. 443-533.
International Search Report dated Sep. 25, 2018 for corresponding Application No. PCT/JP2018/024777.
Written Opinion of the International Search Authority dated Sep. 25, 2018 for corresponding Application No. PCT/JP2018/024777.
Moritomi et al.; "Polypropylene Compounds for Automotive Applications"; Sumitomo Chemical Co., Ltd.; vol. 10-I, p. 4-17, 2010.

(Continued)

*Primary Examiner* — Rip A Lee
(74) *Attorney, Agent, or Firm* — Foley & Lardner LLP

(57) ABSTRACT

An object of the present invention is to provide a highly heat resistant and highly rigid propylene-based polymer having unprecedentedly high stereoregularity. The propylene-based polymer of the present invention satisfies requirements (1) to (4) and preferably requirement (5): (1) an average meso chain length is 800 to 100,000; (2) a MFR is 0.5 to 1,000 g/10 minutes; (3) a ratio of Mw to Mn, Mw/Mn, as measured by GPC is 4.2 to 20; (4) when the ratio of a component which elutes at a temperature of 122° C. or more as measured by temperature rising elution fractionation (TREF) is A % by weight and the melt flow rate of the requirement (2) is B g/10 minutes, $100 \geq A \geq 20 \times \mathrm{EXP}(-0.01 \times B)$; (5) an amount of a component soluble in n-decane at 23° C. is 0.01 to 2% by weight.

9 Claims, No Drawings

(56) References Cited

U.S. PATENT DOCUMENTS

| | | | | |
|---|---|---|---|---|
| 6,184,328 B1* | 2/2001 | Yanagihara | ............ | C08F 4/6492 502/104 |
| 6,306,973 B1* | 10/2001 | Takaoka | .................. | C08L 53/00 525/240 |
| 6,323,298 B1 | 11/2001 | Yanagihara et al. | | |
| 6,495,634 B2* | 12/2002 | Huffer | ...................... | C08L 23/14 525/240 |
| 6,759,475 B2* | 7/2004 | Sakai | ...................... | C08L 23/10 524/515 |
| 6,759,500 B1* | 7/2004 | Dolle | ...................... | C08F 10/00 526/351 |
| 6,825,280 B1* | 11/2004 | Hayakawa | .............. | C08L 23/10 525/240 |
| 6,906,155 B1* | 6/2005 | Minami | .................. | C07F 17/00 502/103 |
| 6,916,886 B2* | 7/2005 | Morioka | ............. | C08F 297/083 525/323 |
| 7,022,795 B1* | 4/2006 | Huffer | ...................... | C08F 10/00 502/115 |
| 7,056,592 B2* | 6/2006 | Kim | ...................... | C08F 110/06 428/500 |
| 7,122,498 B2* | 10/2006 | Hart | ......................... | C07F 17/00 502/152 |
| 7,173,099 B1* | 2/2007 | Minami | .................. | C08F 10/06 526/133 |
| 7,199,202 B2* | 4/2007 | Minami | .................. | C07F 17/00 526/126 |
| 7,220,696 B2 | 5/2007 | Matsunaga et al. | | |
| 7,220,812 B2* | 5/2007 | Jaaskelainen | ......... | C08F 210/16 526/348 |
| 7,465,776 B2* | 12/2008 | Meverden | ............. | C08F 110/06 526/124.3 |
| 7,662,901 B2* | 2/2010 | Meverden | ............. | C08F 110/06 526/351 |
| 7,875,682 B2* | 1/2011 | Yukawa | .................. | C08L 53/00 525/323 |
| 8,039,552 B2* | 10/2011 | Fujiwara | ................. | C08L 53/00 525/88 |
| 8,263,692 B2* | 9/2012 | Sheard | .................... | C07C 37/02 524/287 |
| 9,322,114 B2* | 4/2016 | MacDonald | ............. | D04H 3/14 |
| 9,376,559 B2* | 6/2016 | Holtcamp | ............... | C08L 23/08 |
| 9,382,411 B2* | 7/2016 | MacDonald | ............ | C08L 23/12 |
| 9,458,254 B2* | 10/2016 | Canich | ................ | C08F 4/65908 |
| 9,458,260 B2* | 10/2016 | Canich | .................. | C08F 210/06 |
| 10,011,669 B2* | 7/2018 | Sugano | ................. | C08F 210/06 |
| 10,100,183 B2* | 10/2018 | MacDonald | ............ | C08L 23/12 |
| 2004/0259721 A1 | 12/2004 | Matsunaga et al. | | |
| 2006/0235172 A1* | 10/2006 | Vestberg | ................. | C08F 10/06 526/124.3 |
| 2007/0276095 A1* | 11/2007 | Resconi | ................ | C08F 210/06 525/240 |
| 2009/0098786 A1 | 4/2009 | Tajima et al. | | |
| 2015/0274907 A1* | 10/2015 | MacDonald | ............ | C08L 23/12 428/523 |

FOREIGN PATENT DOCUMENTS

| | | |
|---|---|---|
| JP | H08-003215 A | 1/1996 |
| JP | H08-143580 A | 6/1996 |
| JP | H08-143620 A | 6/1996 |
| JP | H09-040714 A | 2/1997 |
| JP | 2004-002742 A | 1/2004 |
| JP | 2008-540815 A | 11/2008 |
| WO | WO-95/31490 A1 | 11/1995 |
| WO | WO-2006/051708 A1 | 5/2006 |

OTHER PUBLICATIONS

Office Action dated Sep. 15, 2020 for corresponding Japanese Patent Application No. 2019-527054.

Yanagihara et al.; "Highly Isospecific Polymerization of Propylene by Modified Isospecific Catalyst"; Olta Research Center, SunAllomer Ltd.; Mar. 12, 2002; vol. 59; No. 6; p. 364-370.

* cited by examiner

PROPYLENE-BASED POLYMER, METHOD FOR PRODUCING THE SAME, PROPYLENE-BASED RESIN COMPOSITION AND MOLDED ARTICLE

RELATED APPLICATIONS

The present application claims priority under 37 U.S.C. § 371 to International Patent Application No. PCT/JP2018/024777, filed Jun. 29, 2018, which claims priority to and the benefit of Japanese Patent Application No. 2017-128735, filed on Jun. 30, 2017. The contents of these applications are hereby incorporated by reference in their entireties.

TECHNICAL FIELD

The present invention relates to a propylene-based polymer having unprecedentedly high stereoregularity, a method for producing the same, a propylene-based resin composition containing the propylene-based polymer, and a molded article made of the propylene-based polymer or the propylene-based resin composition.

BACKGROUND ART

Heretofore, Ziegler-Natta catalysts made of a titanium catalyst component and an organoaluminum compound have been widely used as a catalyst for producing polyolefin.

In particular, when producing highly stereoregular polyolefin such as polypropylene, catalysts made of a solid titanium catalyst component containing an internal donor (internal electron donor), an organoaluminum compound and an external donor (external electron donor) have been usually used. For example, a catalyst for polymerizing olefin is known which is made of a magnesium chloride-supported solid titanium catalyst containing carboxylic acid ester as an internal donor, an organoaluminum compound and an organosilicon compound as an external donor (see, for example, Patent Literatures 1 and 2).

However, polymerization of olefin using a catalyst containing a solid titanium catalyst component as described above have had the problem of formation of low stereoregular polyolefin as a by-product, due to what is called the "excess titanium compound," as well as highly stereoregular polyolefin (Patent Literature 3).

Meanwhile, in the automobile industry, environmental-friendly, fuel efficient cars are being actively developed. Resinification of materials and further thinning them is required to reduce weight in the field of automobile materials. Thus, improvement in propylene-based materials, which have had many results as an automobile material including a bumper material, is greatly expected, and a highly rigid and highly heat resistant propylene-based polymer having unprecedentedly high stereoregularity is required.

CITATION LIST

Patent Literature

Patent Literature 1: Japanese Patent Laid-Open No. H08-003215
Patent Literature 2: Japanese Patent Laid-Open No. H08-143620
Patent Literature 3: Japanese Patent Laid-Open No. S59-124909

SUMMARY OF INVENTION

Technical Problem

In view of the above prior art, an object of the present invention is to provide a propylene-based polymer having unprecedentedly high stereoregularity, as well as high rigidity and high heat resistance, a method for stably producing the highly stereoregular propylene-based polymer at high activity with a reduced amount of low stereoregular polypropylene as a by-product, a resin composition containing the highly stereoregular propylene-based polymer and a molded article formed of the highly stereoregular propylene-based polymer or the resin composition.

Furthermore, in order to further reduce wall thickness, a highly rigid and highly heat resistant propylene-based polymer having unprecedentedly high stereoregularity in high MFR regions, in which a polymer has excellent moldability (flowability), is required. Thus, another object is to provide a molded article formed of the highly stereoregular propylene-based polymer in high MFR regions or a resin composition containing the propylene-based polymer.

Solution to Problem

The present inventors have conducted intensive studies to solve the above problem and as a result have found that, by polymerizing propylene in combination with, for example, a specific solid titanium catalyst component and a specific external donor, an unprecedentedly highly stereoregular propylene-based polymer can be obtained which has a very long meso chain (a propylene unit chain in which α-methyl carbon atoms are directed in the same direction) and also has a component which elutes at high temperature in TREF (temperature rising elution fractionation) in relation to MFR. The present inventors have also found that the highly stereoregular propylene-based polymer can be stably obtained at high activity with a reduced amount of low stereoregular polypropylene as a by-product by polymerizing propylene in combination with, for example, a specific solid titanium catalyst component and a specific external donor, and have completed the present invention.

The propylene-based polymer of the present invention satisfies the following requirements (1) to (4) and preferably the following requirement (5).

(1) an average meso chain length is 800 to 100,000;
(2) a melt flow rate (MFR) (ASTM D1238, 230° C., under a load of 2.16 kg) is 0.5 to 1,000 g/10 minutes;
(3) a ratio of the weight average molecular weight Mw to the number average molecular weight Mn, Mw/Mn, as measured by gel permeation chromatography (GPC) is 4.2 to 20;
(4) when the ratio of a component which elutes at a temperature of 122° C. or more as measured by temperature rising elution fractionation (TREF) is A % by weight and the melt flow rate of the requirement (2) is B g/10 minutes, A and B satisfy the following formula (I):

$$100 \geq A \geq 20 \times \text{EXP}(-0.01 \times B) \qquad \text{(I); and}$$

(5) an amount of a component soluble in n-decane at 23° C. is 0.01 to 2% by weight.

The propylene polymer of the present invention can be produced by polymerizing propylene in the presence of a catalyst for olefin polymerization. The catalyst for olefin polymerization is, for example,
catalyst [A] containing (i) a solid titanium catalyst component which contains magnesium, titanium, halogen and an electron donor, and satisfies the following requirements (k1) to (k4), (ii) an organosilicon compound component represented by the following formula (II) and (iii) an organometallic compound component containing an element of group 1, group 2 or group 13 in the periodic table, or catalyst [B] containing a pre-polymerization catalyst (p) in which propylene is pre-polymerized with the catalyst [A], the organosilicon compound component (ii) and the organometallic compound component (iii).

(k1) a titanium content is 2.5% by weight or less,
(k2) an electron donor content is 8 to 30% by weight,
(k3) an electron donor/titanium (weight ratio) is 7 or more, and
(k4) substantially no titanium desorbs when washed with hexane at room temperature.

$$R^1Si(OR^2)_2(NR^3R^4) \quad (II)$$

wherein $R^1$ represents a secondary or tertiary hydrocarbon group having 1 to 20 carbon atoms, $R^2$ represents a hydrocarbon group having 1 to 4 carbon atoms, $R^3$ represents a hydrocarbon group having 1 to 12 carbon atoms or a hydrogen atom, and $R^4$ represents a hydrocarbon group having 1 to 12 carbon atoms.

The solid titanium catalyst component (i) may be produced by a method including the step of bringing, into contact with each other,
(a) solid titanium which contains magnesium, titanium, halogen and an electron donor, wherein titanium does not desorb when washed with hexane at room temperature,
(b) an aromatic hydrocarbon,
(c) liquid titanium and
(d) an electron donor.

The propylene-based resin composition of the present invention contains the propylene-based polymer of the present invention.

The molded article of the present invention is formed of the propylene-based polymer or the propylene-based resin composition of the present invention.

Advantageous Effects of Invention

A propylene-based polymer which can be obtained according to the present invention is highly rigid and highly heat resistant and has unprecedentedly high stereoregularity because the polymer contains a very long meso chain and a component which elutes at high temperature in TREF. According to the method of production of the present invention, the propylene polymer can be stably produced at high activity, and the amount of low stereoregular polypropylene produced as a by-product is small.

DESCRIPTION OF EMBODIMENTS

Hereinafter the present invention will be described in detail.

[Propylene-Based Polymer]

A first aspect of the propylene-based polymer of the present invention satisfies the following requirements (1) to (4). A second aspect of the propylene-based polymer of the present invention satisfies the following requirements (1) to (5). In the following, the first aspect and the second aspect will be collectively referred to as "the propylene-based polymer of the present invention."

(1) an average meso chain length is 800 to 100,000;
(2) a melt flow rate (MFR) (ASTM D1238, 230° C., under a load of 2.16 kg) is 0.5 to 1,000 g/10 minutes;
(3) a ratio of the weight average molecular weight Mw to the number average molecular weight Mn, Mw/Mn, as measured by gel permeation chromatography (GPC) is 4.2 to 20;
(4) when the ratio of a component which elutes at a temperature of 122° C. or more as measured by temperature rising elution fractionation (TREF) is A % by weight and the melt flow rate of the requirement (2) is B g/10 minutes, A and B satisfy the following formula (I):

$$100 \geq A \geq 20 \times EXP(-0.01 \times B) \quad (I); \text{ and}$$

(5) an amount of a component soluble in n-decane at 23° C. is 0.01 to 2% by weight.

The requirements will be each described below.

<Requirement (1)>

The propylene-based polymer of the present invention has an average meso chain length of 800 to 100,000, preferably 900 to 50,000, and more preferably 1,000 to 10,000. When the average meso chain length is in the above range, stereoregularity of the propylene-based polymer is sufficiently high, and heat resistance and mechanical properties such as flexural modulus of the propylene-based polymer are improved. The average meso chain length may be determined by the method described in Examples described later.

<Requirement (2)>

The propylene-based polymer of the present invention has a MFR (ASTM D1238, 230° C., under a load of 2.16 kg) of 0.5 to 1,000 g/10 minutes, preferably 1.0 to 800 g/10 minutes, and more preferably 1.5 to 500 g/10 minutes. When the MFR is in the above range, the balance between moldability and mechanical strength of the propylene-based polymer is excellent. The propylene-based polymer of the present invention has unprecedentedly high stereoregularity in a high MFR region of preferably 50 to 1,000 g/10 minutes, more preferably 100 to 1,000 g/10 minutes, and particularly preferably 100 to 500 g/10 minutes.

<Requirement (3)>

The propylene-based polymer of the present invention has a ratio of the weight average molecular weight (Mw) to the number average molecular weight (Mn), Mw/Mn, as measured by GPC of 4.2 to 20, preferably 4.5 to 15, and more preferably 4.8 to 10. A Mw/Mn in the above range is preferred in view of moldability of the propylene-based polymer.

<Requirement (4)>

The propylene-based polymer of the present invention satisfies the following formula (I). In formula (I), A (% by weight) represents the ratio of a component which elutes at a temperature of 122° C. or more as measured by TREF, and B (g/10 minutes) represents the melt flow rate of the requirement (2).

$$100 \geq A \geq 20 \times EXP(-0.01 \times B) \quad (I)$$

The propylene-based polymer which satisfies the above formula (I) is preferred in that the polymer has stereoregularity which provides certain heat resistance and high rigidity even if MFR is higher than a certain value.

<Requirement (5)>

In the second aspect of the propylene-based polymer of the present invention, the amount of a component soluble in n-decane at 23° C. is 0.01 to 2% by weight, preferably 0.1 to 1.8% by weight, and more preferably 0.2 to 1.5% by weight. When the amount of the decane-soluble component is in the above range, a sufficient amount of high crystalline components is secured, and production of a low stereoregular component as a by-product is suppressed.

The propylene-based polymer of the present invention described above can be prepared by polymerizing propylene in the presence of a catalyst for olefin polymerization described later.

The propylene-based polymer of the present invention preferably satisfies the following requirement (6) in addition to the above requirements (1) to (4) or the above requirements (1) to (5), and more preferably simultaneously satisfies the following requirement (7).

(6) a ratio of a component which elutes at a temperature of 122° C. or more as measured by TREF is 0.1 to 100% by weight;

(7) a mesopentad fraction (mmmm) determined by $^{13}$C-NMR is 99.4 to 100%.

<Requirement (6)>

The propylene-based polymer of the present invention has a ratio A of a component which elutes at a temperature of 122° C. or more as measured by TREF of preferably 0.1 to 100% by weight, more preferably 0.2 to 80% by weight, and particularly preferably 0.3 to 50% by weight. When the ratio of the eluting component is in the above range, stereoregularity of the propylene-based polymer is sufficiently high, and heat resistance and mechanical properties such as flexural modulus of the propylene-based polymer are improved.

<Requirement (7)>

The propylene-based polymer of the present invention has a mesopentad fraction (mmmm) determined by $^{13}$C-NMR of preferably 99.4 to 100%, more preferably 99.45 to 99.99%, and particularly preferably 99.5 to 99.95%. When the mesopentad fraction is in the above range, stereoregularity of the propylene-based polymer is likely to be sufficiently high.

The mesopentad fraction as used herein, which is the ratio of the presence of a pentad isostatic structure in a molecular chain, is a fraction of a propylene structural unit which exists at the center of a chain having five consecutive meso structures. The mesopentad fraction may be determined by the method described in Examples described later.

[Catalyst for Olefin Polymerization]

The catalyst for olefin polymerization which can be used in the present invention is not particularly limited as long as the propylene-based polymer of the present invention described above can be obtained. Examples thereof include catalyst [A] containing
(i) a solid titanium catalyst component which contains magnesium, titanium, halogen and an electron donor, and satisfies the following requirements (k1) to (k4),
(ii) an organosilicon compound component represented by the following formula (II) and
(iii) an organometallic compound component containing an element of group 1, group 2 or group 13 in the periodic table, and
catalyst [B] containing
a pre-polymerization catalyst (p) in which propylene is pre-polymerized with the catalyst [A], the organosilicon compound component (ii) and the organometallic compound component (iii).

(k1) a titanium content is 2.5% by weight or less;
(k2) an electron donor content is 8 to 30% by weight;
(k3) an electron donor/titanium (weight ratio) is 7 or more; and
(k4) substantially no titanium desorbs when washed with hexane at room temperature.

$$R^1Si(OR^2)_2(NR^3R^4) \quad (II)$$

wherein $R^1$ represents a secondary or tertiary hydrocarbon group having 1 to 20 carbon atoms, $R^2$ represents a hydrocarbon group having 1 to 4 carbon atoms, $R^3$ represents a hydrocarbon group having 1 to 12 carbon atoms or a hydrogen atom, and $R^4$ represents a hydrocarbon group having 1 to 12 carbon atoms.

The components constituting the catalyst for olefin polymerization will be each described below.

<Solid Titanium Catalyst Component (i)>

The solid titanium catalyst component (i) may be produced by a method including the step of bringing, into contact with each other,
(a) solid titanium which contains magnesium, titanium, halogen and an electron donor, wherein titanium does not desorb when washed with hexane at room temperature,
(b) an aromatic hydrocarbon,
(c) liquid titanium and
(d) an electron donor.

<<(a) Solid Titanium>>

The solid titanium (a) may be prepared by bringing a magnesium compound, a titanium compound, an electron donor (internal donor) and the like into contact with each other by various methods according to a known method for preparing a solid titanium catalyst component (see, for example, Japanese Patent Laid-Open No. H04-096911, Japanese Patent Laid-Open No. S58-83006, Japanese Patent Laid-Open No. H08-143580).

It is preferable that the magnesium compound be used in the form of solid. The magnesium compound in the form of solid may be a magnesium compound itself in the form of solid, or may be an adduct with an electron donor. Examples of magnesium compounds include the magnesium compounds disclosed in Japanese Patent Laid-Open No. 2004-2742, which are specifically magnesium chloride, ethoxy magnesium chloride, butoxy magnesium and the like. Examples of electron donors include the compounds capable of dissolving a magnesium compound disclosed in Japanese Patent Laid-Open No. 2004-2742, which are specifically alcohol, aldehyde, amine, carboxylic acid and a mixture thereof. The amount to be used of the magnesium compound and the electron donor varies depending on their type, conditions of contact and the like. The magnesium compound may be used in an amount of 0.1 to 20 moles/liter, preferably 0.5 to 5 moles/liter based on the liquid electron donor.

It is preferable that the titanium compound be used in the form of liquid. Examples of such titanium compounds include a tetravalent titanium compound represented by the following formula (III).

$$Ti(OR^5)_gX_{4-g} \quad (III)$$

wherein $R^5$ represents a hydrocarbon group, X represents a halogen atom and $0 \leq g \leq 4$.

Titanium tetrachloride is particularly preferred as the titanium compound. Two or more of the above titanium compounds may be used in combination.

Examples of the electron donors (internal donors) include compounds represented by the following formula (IV) (hereinafter also referred to as compound (IV)).

[Chem. 1]

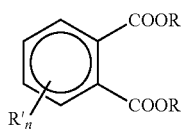

(IV)

In the formula (IV), R represents a linear or branched alkyl group having 1 to 10, preferably 2 to 8, and more preferably 3 to 6 carbon atoms, R' represents a linear or branched alkyl group having 1 to 10 carbon atoms, and n represents an integer of 0 to 4. A compound in which n is 0 is preferred in the present invention.

Examples of alkyl groups of R and R' include a methyl group, an ethyl group, a n-propyl group, an iso-propyl group, a n-butyl group, an iso-butyl group, a tert-butyl group, a pentyl group, a hexyl group, a heptyl group, an octyl group, a nonyl group and a decyl group.

Specific examples of the compounds (IV) include dimethyl phthalate, methyl ethyl phthalate, diethyl phthalate, n-propyl phthalate, diisopropyl phthalate, di-n-butyl phthalate, diisobutyl phthalate, di-n-pentyl phthalate, dineopentyl phthalate, di-n-hexyl phthalate, di-n-heptyl phthalate, di(methylhexyl) phthalate, di(dimethylpentyl) phthalate, di(ethylpentyl) phthalate, di(2,2,3-trimethylbutyl) phthalate, di-n-octyl phthalate and di-2-ethylhexyl phthalate. Of them, diisobutyl phthalate is particularly preferred.

In the present invention, an electron donor other than the compound (IV) may be used as the electron donor (internal donor). Examples of other electron donors include a compound having two or more ether bonds existing through a plurality of atoms (hereinafter also referred to as a "polyether compound").

Examples of the polyether compounds include compounds in which the atoms existing between ether bonds are carbon, silicon, oxygen, nitrogen, sulfur, phosphorus, boron or two or more atoms selected from them. Of them, a compound which has a relatively bulky substituent bonded to the atom between ether bonds and also includes a plurality of carbon atoms as the atom existing between two or more ether bonds is preferred. For example, a polyether compound represented by the following formula (3) is preferred.

[Chem. 2]

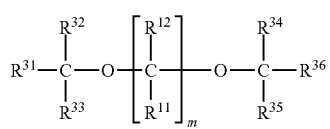

(3)

In the formula (3), m is an integer of 1 to 10, preferably an integer of 3 to 10, and more preferably an integer of 3 to 5. $R^{11}$, $R^{12}$, $R^{31}$ to $R^{36}$ are each independently a hydrogen atom or a substituent having at least one element selected from carbon, hydrogen, oxygen, fluorine, chlorine, bromine, iodine, nitrogen, sulfur, phosphorus, boron and silicon. $R^{11}$ and $R^{12}$ are each independently preferably a hydrocarbon group having 1 to 10 carbon atoms, and more preferably a hydrocarbon group having 2 to 6 carbon atoms. $R^{31}$ to $R^{36}$ are each independently preferably a hydrogen atom or a hydrocarbon group having 1 to 6 carbon atoms.

Specific examples of $R^{11}$ and $R^{12}$ include a methyl group, an ethyl group, a n-propyl group, an isopropyl group, a n-butyl group, an isobutyl group, an isopentyl group, a neopentyl group, a hexyl group, a heptyl group, an octyl group, a 2-ethylhexyl group, a decyl group, a cyclopentyl group and a cyclohexyl group. Of them, an ethyl group, a n-propyl group, an isopropyl group, a n-butyl group and an isobutyl group are preferred. Specific examples of $R^{31}$ to $R^{36}$ include a hydrogen atom, a methyl group, an ethyl group, a n-propyl group, an isopropyl group, a n-butyl group and an isobutyl group. Of them, a hydrogen atom and a methyl group are preferred. Any of $R^{11}$, $R^{12}$, $R^{31}$ to $R^{36}$ (preferably $R^{11}$, $R^{12}$) may jointly form a ring other than a benzene ring, or may contain an atom other than carbon in the main chain.

Specific examples of polyether compounds described above include 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2-methyl-2-propyl-1,3-dimethoxypropane, 2-methyl-2-ethyl-1,3-dimethoxypropane, 2-methyl-2-isopropyl-1,3-dimethoxypropane, 2-methyl-2-cyclohexyl-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-cyclohexyl-2-cyclohexylmethyl-1,3-dimethoxypropane, 2,3-dicyclohexyl-1,4-diethoxybutane, 2,3-diisopropyl-1,4-diethoxybutane, 2,4-diisopropyl-1,5-dimethoxypentane, 2,4-diisobutyl-1,5-dimethoxypentane, 2,4-diisoamyl-1,5-dimethoxypentane, 3-methoxymethyltetrahydrofuran, 3-methoxymethyldioxane, 1,2-diisobutoxypropane, 1,2-diisobutoxyethane, 1,3-diisoamyloxyethane, 1,3-diisoamyloxypropane, 1,3-diisoneopentyloxyethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2-cyclohexyl-2-ethoxymethyl-1,3-diethoxypropane, 2-cyclohexyl-2-methoxymethyl-1,3-dimethoxypropane, 2,2-diisobutyl-1,3-dimethoxycyclohexane, 2-isopropyl-2-isoamyl-1,3-dimethoxycyclohexane, 2-cyclohexyl-2-methoxymethyl-1,3-dimethoxycyclohexane, 2-isopropyl-2-methoxymethyl-1,3-dimethoxycyclohexane, 2-isobutyl-2-methoxymethyl-1,3-dimethoxycyclohexane, 2-cyclohexyl-2-ethoxymethyl-1,3-diethoxycyclohexane, 2-cyclohexyl-2-ethoxymethyl-1,3-dimethoxycyclohexane, 2-isopropyl-2-ethoxymethyl-1,3-diethoxycyclohexane, 2-isopropyl-2-ethoxymethyl-1,3-dimethoxycyclohexane, 2-isobutyl-2-ethoxymethyl-1,3-diethoxycyclohexane and 2-isobutyl-2-ethoxymethyl-1,3-dimethoxycyclohexane.

Of them, 1,3-diethers are preferred, and 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)1,3-dimethoxypropane are more preferred. These compounds may be used singly or in combinations of two or more thereof.

<<Preparation of Solid Titanium (a)>>

The solid titanium (a) may be prepared by bringing the above magnesium compound, titanium compound and electron donor into contact with each other. Here, it is preferable that a magnesium compound in the form of solid be suspended in a hydrocarbon solvent and used. Furthermore, when bringing these components into contact with each other, a liquid titanium compound may be used once to give solid product (1), or the resulting solid product (1) may be further brought into contact with a liquid titanium compound to give solid product (2). It is preferable to wash the solid product (1) or (2) with a hydrocarbon solvent according to need and then prepare a solid titanium (a).

The above components are brought into contact with each other at a temperature of usually −70° C. to +200° C., preferably −50° C. to +150° C., and more preferably −30° C. to +130° C. The amount of the components used for preparing the solid titanium (a) varies depending on the method of preparation and cannot be definitely determined. For example, based on 1 mole of the magnesium compound, the electron donor may be used in an amount of 0.01 to 10 moles, preferably 0.1 to 5 moles, and the titanium compound may be used in an amount of 0.01 to 1,000 moles, preferably 0.1 to 200 moles.

In the present invention, although the solid product (1) or (2) prepared as described above may be directly used as the solid titanium (a), it is preferable that the solid product be washed with a hydrocarbon solvent at 0 to 150° C.

An aliphatic hydrocarbon solvent such as hexane, heptane, octane, nonane, decane or cetane, a halogen-free aromatic hydrocarbon solvent such as toluene, xylene or benzene, or a halogen-containing aromatic hydrocarbon solvent is used as the hydrocarbon solvent. Of these, an aliphatic hydrocarbon solvent or a halogen-free aromatic hydrocarbon solvent is preferably used.

For washing the solid product, usually 10 to 500 ml, and preferably 20 to 100 ml of the hydrocarbon solvent is used based on 1 g of the solid product. The solid titanium (a) prepared as described above contains magnesium, titanium, halogen and an electron donor. It is preferable that in the solid titanium (a), an electron donor/titanium (weight ratio) be 6 or less.

When the solid titanium (a) prepared as described above is washed with hexane at room temperature, no titanium desorbs therefrom.

<<(b) Aromatic Hydrocarbon>>

Examples of aromatic hydrocarbons (b) used for contact with the solid titanium (a) include benzene, toluene, xylene, ethylbenzene, and halogen-containing hydrocarbons thereof. Of them, xylene (in particular, paraxylene) is preferred. Bringing the solid titanium (a) into contact with such an aromatic hydrocarbon (b) reduces the amount of what is called the "excess titanium compound," which produces a low stereoregular component as a by-product.

<<(c) Liquid Titanium>>

Examples of liquid titanium (c) used for contact with the solid titanium (a) are the same as those described for the titanium compounds used for preparing the solid titanium (a). Of those, tetrahalogenated titanium is preferred, and titanium tetrachloride is particularly preferred.

<<(d) Electron Donor>>

Examples of electron donors (d) used for contact with the solid titanium (a) are the same as those given as examples of the electron donor (internal donor) described above. Of those, the same electron donor as used for preparing the solid titanium (a) is preferably used.

<<Method for Preparing Solid Titanium Catalyst Component (i)>>

The solid titanium (a), the aromatic hydrocarbon (b), the liquid titanium (c) and the electron donor (d) are brought into contact with each other at a temperature of usually 110 to 160° C., preferably 115° C. to 150° C., for 1 minute to 10 hours, preferably 10 minutes to 5 hours.

In the contact, usually 1 to 10,000 ml, preferably 5 to 5,000 ml, and more preferably 10 to 1,000 ml of the aromatic hydrocarbon (b) is used based on 1 g of the solid titanium (a). Usually 0.1 to 50 ml, preferably 0.2 to 20 ml, and particularly preferably 0.3 to 10 ml of the liquid titanium (c) is used based on 100 ml of the aromatic hydrocarbon (b). Usually 0.01 to 10 ml, preferably 0.02 to 5 ml, particularly preferably 0.03 to 3 ml of the electron donor (d) is used based on 100 ml of the aromatic hydrocarbon (b).

The order of the contact of the solid titanium (a), aromatic hydrocarbon (b), liquid titanium (c) and electron donor (d) is not particularly limited, and they may be brought into contact with each other simultaneously or sequentially.

It is preferable that the solid titanium (a), aromatic hydrocarbon (b), liquid titanium (c) and electron donor (d) be brought into contact with each other in an inert gas atmosphere with stirring. For example, it is preferable that in a glass flask equipped with a stirrer whose atmosphere is thoroughly replaced with nitrogen, a slurry of the solid titanium (a), aromatic hydrocarbon (b), liquid titanium (c) and electron donor (d) be stirred at the above temperature at a rotation number of the stirrer of 100 to 1,000 rpm, and preferably 200 to 800 rpm for the above time to bring the solid titanium (a), aromatic hydrocarbon (b), liquid titanium (c) and electron donor (d) into contact with each other.

The solid titanium (a) and the aromatic hydrocarbon (b) after contact may be separated by filtration.

This contact of the solid titanium (a) with the aromatic hydrocarbon (b) produces a solid titanium catalyst component (i) in which the titanium content is smaller than that of the solid titanium (a). More specifically, a solid titanium catalyst component (i) is obtained in which the titanium content is 25% by weight or more, preferably 30 to 95% by weight, and more preferably 40 to 90% by weight smaller than that of the solid titanium (a).

The solid titanium catalyst component (i) prepared as described above contains magnesium, titanium, halogen and an electron donor, and satisfies the following requirements (k1) to (k4), and preferably also satisfies the following requirement (k5).

(k1) The titanium content of the solid titanium catalyst component (i) is 2.5% by weight or less, preferably 2.2 to 0.1% by weight, more preferably 2.0 to 0.2% by weight, particularly preferably 1.8 to 0.3% by weight, and most preferably 1.5 to 0.4% by weight.

(k2) An electron donor content is 8 to 30% by weight, preferably 9 to 25% by weight, and more preferably 10 to 20% by weight.

(k3) An electron donor/titanium (weight ratio) is 7 or more, preferably 7.5 to 35, more preferably 8 to 30, and particularly preferably 8.5 to 25.

(k4) When the solid titanium catalyst component (i) is washed with hexane at room temperature, substantially no titanium desorbs therefrom. Washing the solid titanium catalyst component (i) with hexane means washing with usually 10 to 500 ml, and preferably 20 to 100 ml of hexane per 1 g of the solid titanium catalyst component (i) for 5 minutes. The room temperature means 15 to 25° C. Furthermore, substantially no desorption of titanium means that the concentration of titanium in hexane used as the washing solution is 0.1 g/liter or less.

(k5) The solid titanium catalyst component (i) has an average particle size of 5 to 70 μm, preferably 7 to 65 μm, more preferably 8 to 60 μm, and particularly preferably 10 to 55 μm.

The amount of magnesium, halogen, titanium and the electron donor is in % by weight based on the unit weight of the solid titanium catalyst component (i). The quantity of magnesium, halogen and titanium is determined by inductively coupled plasma emission spectrometry (ICP), and the quantity of the electron donor is determined by gas chromatography. The average particle size of the catalyst is measured by a centrifugal sedimentation method using a decalin solvent.

When the solid titanium catalyst component (i) described above is used as a catalyst component for olefin polymerization, propylene can be polymerized at high activity and highly stereoregular polypropylene can be stably produced with a reduced production of low stereoregular polypropylene.

<Organosilicon Compound Component (ii)>

The organosilicon compound component (ii) which constitutes the catalyst for olefin polymerization according to the present invention is represented by the following formula (II).

$$R^1Si(OR^2)_2(NR^3R^4) \quad (II)$$

In formula (II), $R^1$ represents a secondary or tertiary hydrocarbon group having 1 to 20 carbon atoms, $R^2$ represents a hydrocarbon group having 1 to 4 carbon atoms, $R^3$ represents a hydrocarbon group having 1 to 12 carbon atoms or a hydrogen atom, and $R^4$ represents a hydrocarbon group having 1 to 12 carbon atoms.

Examples of $R^1$ include alicyclic hydrocarbon groups such as a cyclobutyl group, a cyclopentyl group, a cyclopentenyl group, a cyclopentadienyl group, a cyclohexyl group, a cyclohexynyl group, and these groups having a substituent.

When $R^1$ is a hydrocarbon group in which carbon adjacent to Si is secondary carbon, examples thereof include an i-propyl group, a s-butyl group, a s-amyl group and an α-methylbenzyl group. When $R^1$ is a hydrocarbon group in which carbon adjacent to Si is tertiary carbon, examples thereof include a tert-butyl group, a tert-amyl group, an α,α'-dimethylbenzyl group and an adamantyl group.

Of them, a cyclopentyl group and a cyclobutyl group are preferred, and a cyclopentyl group is particularly preferred.

Examples of $R^2$ include a methyl group, an ethyl group, a n-propyl group, an iso-propyl group, an n-butyl group, an iso-butyl group, a ter-butyl group, a sec-butyl group, a n-pentyl group, an iso-pentyl group, a cyclopentyl group, a n-hexyl group and a cyclohexyl group. Of them, a methyl group and an ethyl group are particularly preferred.

Examples of $R^3$ include hydrogen, a methyl group, an ethyl group, an n-propyl group, an iso-propyl group, a n-butyl group, an iso-butyl group, a ter-butyl group, a sec-butyl group, a n-pentyl group, an iso-pentyl group, a cyclopentyl group, a n-hexyl group, a cyclohexyl group and an octyl group. Of them, an ethyl group is particularly preferred.

Examples of $R^4$ include a methyl group, a ethyl group, a n-propyl group, an iso-propyl group, a n-butyl group, an iso-butyl group, a ter-butyl group, a sec-butyl group, a n-pentyl group, an iso-pentyl group, a cyclopentyl group, a n-hexyl group, a cyclohexyl group and an octyl group. Of them, an ethyl group is particularly preferred.

Specific examples of organosilicon compounds represented by the formula (II) include cyclopentyl diethylamino dimethoxysilane, cyclopentenyl diethylamino dimethoxysilane, cyclopentadienyl diethylamino dimethoxysilane, cyclohexyl diethylamino dimethoxysilane, isopropyl diethylamino dimethoxysilane and tert-butyl diethylamino dimethoxysilane.

Of the organosilicon compounds represented by the formula (II), cyclopentyl diethylamino dimethoxysilane is preferred in view of increasing stereoregularity, in particular, the long length of meso chain and the ratio of a component which elutes at high temperature in TREF.

The organosilicon compound component (ii) described above may be used alone or in a combination of two or more.

A propylene-based polymer having unprecedentedly high stereoregularity can be obtained by using the solid titanium catalyst component (i) and the organosilicon compound component (ii) in combination.

<Organometallic Compound Component (iii)>

The organometallic compound component (iii) which constitutes the catalyst for olefin polymerization according to the present invention contains an element of group 1, group 2 or group 13 in the periodic table. Examples thereof include an organoaluminum compound, an alkyl complex compound of a metal of group 1 and aluminum, and an organometallic compound of a metal of group 2. Two or more of the organometallic compound components (iii) may be used in combination.

<<Organoaluminum Compound>>

The organoaluminum compound is represented by, for example, the following formula.

$$R^a{}_nAlX_{3-n}$$

wherein $R^a$ is a hydrocarbon group having 1 to 12 carbon atoms, X is halogen or hydrogen, and n is 1 to 3.

$R^a$ is a hydrocarbon group having 1 to 12 carbon atoms, such as an alkyl group, a cycloalkyl group or an aryl group, which are specifically, methyl, ethyl, n-propyl, isopropyl, isobutyl, pentyl, hexyl, octyl, a cyclopentyl group, cyclohexyl, phenyl and tolyl.

Examples of organoaluminum compounds described above may also include compounds represented by the following formula.

$$R^a{}_nAlY_{3-n}$$

In the formula, $R^a$ is as defined above, Y is an —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group, n is 1 to 2, $R^b$, $R^c$, $R^d$ and $R^h$ are a methyl group, an ethyl group, an isopropyl group, an isobutyl group, a cyclohexyl group, a phenyl group and the like, $R^e$ is hydrogen, a methyl group, an ethyl group, an isopropyl group, a phenyl group, a trimethylsilyl group and the like, and $R^f$ and $R^g$ are a methyl group, an ethyl group and the like.

Specific examples of such organoaluminum compounds include the following compounds.

Compounds represented by $R^a{}_nAl(OR^b)_{3-n}$, such as dimethylaluminum methoxide, diethylaluminum ethoxide and diisobutylaluminum methoxide.

Compounds represented by $R^a{}_nAl(OSiR^c)_{3-n}$, such as $Et_2Al(OSiMe_3)$, $(iso\text{-}Bu)_2Al(OSiMe_3)$ and $(iso\text{-}Bu)_2Al(OSiEt_3)$.

$R^a{}_nAl(OAlR^d{}_2)_{3-n}$, such as $Et_2AlOAlEt_2$ and $(iso\text{-}Bu)_2AlOAl(iso\text{-}Bu)_2$.

Of the organoaluminum compounds described above, organoaluminum compounds represented by $R^a{}_3Al$ are preferably used.

[Method for Preparing Catalyst for Olefin Polymerization]

The catalyst for olefin polymerization can be produced by a method including the step of bringing, into contact with each other, the solid titanium catalyst component (i), the organosilicon compound component (ii) and the organometallic compound component (iii).

In the present invention, in preparing the catalyst for olefin polymerization from the components (i), (ii) and (iii), other components may be used as necessary.

In the present invention, a pre-polymerization catalyst (p) may be formed from the components described above. The pre-polymerization catalyst (p) is formed by pre-polymerizing propylene in the presence of the components (i), (ii) and (iii) described above and other components used as necessary. Although the pre-polymerization catalyst (p) usually constitutes the catalyst for olefin polymerization together with the organosilicon compound (ii) and the organometallic compound (iii), in some cases the pre-polymerization catalyst (p) alone may be used as the catalyst for olefin polymerization.

[Method for Producing Propylene-Based Polymer]

In the method for producing a propylene-based polymer of the present invention, propylene is polymerized in the presence of the catalyst for olefin polymerization described above.

When polymerizing propylene, a small amount of olefin other than propylene or a small amount of a diene compound may be allowed to coexist in the polymerization system in addition to propylene to produce a random copolymer. Examples of such olefin other than propylene include olefin having 2 to 8 carbon atoms, such as ethylene, 1-butene, 1-pentene, 1-hexene, 4-methyl-1-pentene, 3-methyl-1-pentene, 1-octene and 3-methyl-1-butene. Of them, ethylene is preferred. For random copolymers, the content of comonomers other than propylene is preferably 6% by mole or less, and more preferably 3% by mole or less.

In the present invention, any of a liquid phase polymerization method such as solution polymerization and suspension polymerization and a gas phase polymerization method may be performed. When the type of reaction of polymerization is slurry polymerization, an inert organic solvent may be used as a reaction solvent, and olefin that is liquid at the reaction temperature may be used.

Specific examples of inert organic solvents include aliphatic hydrocarbon such as propane, butane, pentane, hexane, heptane, octane, decane, dodecane and kerosene; alicyclic hydrocarbon; aromatic hydrocarbon; halogenated hydrocarbon, and a mixture thereof. Of them, aliphatic hydrocarbon is particularly preferably used.

For polymerization, the solid titanium catalyst component (i) or the pre-polymerization catalyst (p) is usually used in an amount of about $1 \times 10^{-5}$ to 1 millimole, and preferably about $1 \times 10^{-4}$ to 0.1 millimole in terms of titanium atoms per 1 liter of the polymerization volume.

The organosilicon compound (ii) is usually used in an amount of about 0.001 mole to 10 moles, and preferably 0.01 mole to 5 moles per 1 mole of metal atom of the organometallic compound (iii).

The organometallic compound (iii) is used in such an amount that the amount of metal atom in the compound (iii) is usually about 1 to 2,000 moles, and preferably about 2 to 500 moles per 1 mole of titanium atom in the polymerization system.

Use of the pre-polymerization catalyst (p) in this polymerization in some cases eliminates the need of adding the organosilicon compound (ii) and/or the organometallic compound (iii). When the catalyst for olefin polymerization consists of the pre-polymerization catalyst (p), the component (ii) and the component (iii), the components (ii) and (iii) may be used in the amount as described above.

Using hydrogen in polymerization makes it possible to adjust the molecular weight of the resulting propylene polymer, and thus a polymer having high MFR can be obtained.

In the present invention, polymerization is carried out usually at a temperature of about 20 to 150° C., and preferably about 50 to 100° C., at a pressure of normal pressure to 100 kg/cm², and preferably about 2 to 50 kg/cm².

In the present invention, polymerization may be performed in any system of a batch system, a semi-continuous system, and a continuous system. Furthermore, polymerization may be performed in two or more divided stages in different reaction conditions. Moreover, in the present invention, a homopolymer of propylene may be produced, or a random copolymer or a block copolymer may be produced using olefin other than propylene.

[Propylene-Based Resin Composition]

The propylene-based resin composition of the present invention includes the propylene-based polymer of the present invention described above (hereinafter also referred to as "propylene-based polymer (A)") as an essential component. Components constituting the propylene-based resin composition of the present invention in addition to the propylene-based polymer (A) are not particularly limited, and known components may be mixed according to the purpose of use.

Preferred embodiments of the propylene-based resin composition of the present invention include:

a propylene-based resin composition (hereinafter also referred to as "the first composition") containing:

20 to 80% by mass of a propylene-based block copolymer (C) including a propylene homopolymer unit and a propylene•α-olefin copolymer unit, 1 to 50% by mass of an ethylene•α-olefin copolymer (D) including 50 to 95% by mole of a structural unit derived from ethylene and 5 to 50% by mole of a structural unit derived from α-olefin having 3 to 20 carbon atoms, and 0 to 70% by mass of an inorganic filler (E), the total amount of the components (C), (D) and (E) being 100% by mass, wherein the propylene-based block copolymer (C) contains:

60 to 99% by mass of the propylene-based polymer (A) as the propylene homopolymer unit, and 1 to 40% by mass of a propylene•α-olefin copolymer (B) containing 55 to 90% by mole of a structural unit derived from propylene and 10 to 45% by mole of a structural unit derived from α-olefin having 2 to 20 carbon atoms other than propylene as the propylene•-α-olefin copolymer unit the total amount of the components (A) and (B) being 100% by mass;

a propylene-based resin composition (hereinafter also referred to as "the second composition") containing:

100 parts by mass of the propylene-based polymer (A) and 0.01 to 10 parts by mass of a nucleating agent (F); and a propylene-based resin composition (hereinafter referred to as "the third composition") containing:

70 to 99.5% by mass of at least one component selected from the group consisting of the propylene-based polymer (A) and the propylene-based block copolymer (C), and 0.5 to 30% by mass of an inorganic fiber (G), the total amount of the components (A), (C) and (G) being 100% by mass. The compositions will be each described below.

<First Composition>

The first composition of the present invention is a resin composition containing the propylene-based block copolymer (C), the ethylene•α-olefin copolymer (D), and if necessary, an inorganic filler (E), and the propylene-based block copolymer (C) contains the propylene-based polymer (A) and the propylene•α-olefin copolymer (B). The first composition of the present invention has excellent flowability in molding and can form a molded article having excellent flexural modulus and impact resistance.

In the first composition of the present invention, a propylene homopolymer is used as the propylene-based polymer (A) constituting the propylene-based block copolymer (C).

The first composition of the present invention can be prepared by mixing the propylene-based polymer (A) and the propylene•α-olefin copolymer (B) to give a propylene-based block copolymer (C), and then mixing therewith the ethylene•α-olefin copolymer (D) and if necessary, the inorganic filler (E).

<<Propylene-Based Block Copolymer (C)>>

The propylene-based block copolymer (C) contains the propylene-based polymer (A) in the range of 60 to 99% by mass, preferably 70 to 97% by mass, and more preferably 75 to 95% by mass as a propylene homopolymer unit, and the propylene•α-olefin copolymer (B) in the range of 1 to 40% by mass, preferably 3 to 30% by mass, and more preferably 5 to 25% by mass (provided that the total amount of the components (A) and (B) is 100% by mass).

A molded article with well-balanced rigidity, heat resistance and impact resistance can be prepared by forming the propylene-based block copolymer (C) by using the propylene-based polymer (A) and the propylene•α-olefin copolymer (B) as described above.

<<Propylene•α-Olefin Copolymer (B)>>

The propylene•α-olefin copolymer (B) is a copolymer of propylene and α-olefin having 2 to 20 carbon atoms other than propylene, and contains a structural unit derived from propylene in the range of 55 to 90% by mole, and preferably 60 to 85% by mole, and a structural unit derived from the α-olefin in the range of 10 to 45% by mole, and preferably 15 to 40% by mole (provided that the total amount of the structural unit derived from propylene and the structural unit derived from the α-olefin is 100% by mass).

Examples of α-olefin having 2 to 20 carbon atoms other than propylene include ethylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. These may be used singly or in combinations of two or more thereof. Of them, ethylene is preferred.

The propylene•α-olefin copolymer (B) has a MFR (ASTM D1238E, at a measurement temperature of 230° C. and a load of 2.16 kg) of preferably 0.1 g/10 minutes or more, and more preferably 0.3 to 20 g/10 minutes.

The propylene•α-olefin copolymer (B) may be produced by various known methods, for example, by copolymerizing propylene and α-olefin having 2 to 20 carbon atoms other than propylene in the presence of a metallocene catalyst.

One of the propylene•α-olefin copolymers (B) may be used, or two or more of them may be used in combination.

<<Ethylene•α-Olefin Copolymer (D)>>

The ethylene•α-olefin copolymer (D) is a random copolymer of ethylene and α-olefin having 3 to 20 carbon atoms, and contains a structural unit derived from ethylene in the range of 50 to 95% by mole, and preferably 55 to 90% by mole, and a structural unit derived from the α-olefin in the range of 5 to 50% by mole, and preferably 10 to 45% by mole. Mixing the ethylene•α-olefin copolymer (D) with the propylene-based block copolymer (C) can improve impact resistance.

Examples of α-olefin having 3 to 20 carbon atoms include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. These may be used singly or in combinations of two or more thereof. Of them, propylene, 1-butene, 1-hexene and 1-octene are preferred, and 1-butene and 1-octene are more preferred.

The ethylene•α-olefin copolymer (D) has a MFR (ASTM D1238E, at a measurement temperature of 230° C. and a load of 2.16 kg) of preferably 0.1 to 50 g/10 minutes, more preferably 0.3 to 20 g/10 minutes, and further preferably 0.5 to 10 g/10 minutes. Furthermore, the ethylene•α-olefin copolymer (D) has a density of preferably 0.850 to 0.920 kg/m$^3$, and more preferably 0.855 to 0.900 kg/m$^3$.

A product produced by a known method or a commercially available product may be used as the ethylene•α-olefin copolymer (D). Examples of preferred commercially available products include "TAFMER (registered trademark) A" series and "TAFMER (registered trademark) H" series available from Mitsui Chemicals Inc., "Engage (registered trademark)" series available from DowDuPont Inc., and "Exact (registered trademark)" series available from Exxon Mobil Corporation.

One of the ethylene•α-olefin copolymers (D) may be used, or two or more of them may be used in combination.

<<Inorganic Filler (E)>>

Examples of inorganic fillers (E) include talc, clay, mica, calcium carbonate, magnesium hydroxide, ammonium phosphate, silicates, carbonates, carbon black, a magnesium sulfate fiber, a glass fiber and a carbon fiber. These may be used singly or in combinations of two or more thereof. In the first composition of the present invention, talc is preferably used as the inorganic filler (E).

For the content of the components (C) to (E) in the first composition of the present invention, the content of the component (C) is 20 to 80% by mass, preferably 25 to 75% by mass, and more preferably 30 to 70% by mass, the content of the component (D) is 1 to 50% by mass, preferably 5 to 40% by mass, and more preferably 10 to 30% by mass, and the content of the component (E) is 0 to 70% by mass, preferably to 60% by mass, and more preferably 10 to 50% by mass, provided that the total amount of the components (C) to (E) is 100% by mass.

<Second Composition>

The second composition of the present invention is a resin composition containing the propylene-based polymer (A) and a nucleating agent (F), and can form a molded article having excellent rigidity, heat resistance and flexural modulus.

The propylene-based polymer (A) used for the second composition of the present invention may be a propylene homopolymer or a random copolymer containing a monomer other than propylene as a component of copolymerization.

Examples of nucleating agents (F) described above include an organic nucleating agent such as a sorbitol nucleating agent, a phosphate nucleating agent (organic metal phosphate), a metal salt of aromatic carboxylic acid, a metal salt of aliphatic carboxylic acid and a rosin compound; and an inorganic nucleating agent such as an inorganic compound. These may be used singly or in combinations of two or more thereof.

Examples of commercially available products of the nucleating agent (F) include a phosphate nucleating agent "Adekastab NA-11" (available from ADEKA CORPORATION), a rosin nucleating agent "PINECRYSTAL KM1610" (available from Arakawa Chemical Industries, Ltd.), a nucleating agent composed of a metal salt of aliphatic carboxylic acid "Hyperform HPN-20E" (available from Milliken & Co.), and a sorbitol nucleating agent "Milad NX8000" (available from Milliken & Co.).

The content of the nucleating agent (F) in the second composition of the present invention is preferably 0.01 to 10 parts by mass, more preferably 0.05 to 5 parts by mass, and further preferably 0.1 to 1.0 part by mass based on 100 parts by mass of the propylene-based polymer (A).

<Third Composition>

The third composition of the present invention is a resin composition containing at least one component selected from the group consisting of the propylene-based polymer (A) and the propylene-based block copolymer (C), and an inorganic fiber (G), and can form a molded article with well-balanced rigidity, heat resistance and flexural modulus.

Although the propylene-based polymer (A) used for the third composition of the present invention may be any one of a propylene homopolymer and a random copolymer, the propylene-based polymer (A) constituting the propylene-based block copolymer (C) is a propylene homopolymer.

Examples of the inorganic fiber (G) include a magnesium sulfate fiber, a glass fiber and a carbon fiber. These may be used singly or in combinations of two or more thereof.

When a magnesium sulfate fiber is used, the magnesium sulfate fiber has an average fiber length of preferably 5 to 50 µm, and more preferably 10 to 30 µm. Furthermore, the magnesium sulfate fiber has an average fiber diameter of preferably 0.3 to 2 µm, and more preferably 0.5 to 1 µm. Examples of commercially available products thereof include "MOSHIGE" (available from Ube Material Industries, trade name).

Examples of glass fibers include fiber in the form of filament prepared by melting and spinning glass such as E glass (electrical glass), C glass (chemical glass), A glass (alkali glass), S glass (high strength glass) and alkali resistant glass. The glass fiber is included in the composition in the form of a staple fiber of 1 mm or less or a long fiber of 1 mm or more.

Examples of carbon fibers include a polyacrylonitrile (PAN)-based carbon fiber prepared from polyacrylonitrile as a raw material and a pitch-based carbon fiber prepared from pitch as a raw material. These carbon fibers may be used in the form of what is called a chopped carbon fiber prepared by cutting fiber raw yarn in a desired length. Alternatively, the carbon fibers may be those which have been bundled with various sizing agents.

The content of the inorganic fiber (G) in the third composition of the present invention is preferably 1 to 30% by mass, more preferably 2 to 25% by mass, and further preferably 5 to 20% by mass based on 100% by mass of the total amount of the component (A) and the component (G).

<Other Components>

Other components in addition to the components (A) to (G) described above, such as resin, rubber, a filler, a weathering stabilizer, a thermostabilizer, an anti-static agent, an anti-slip agent, an anti-blocking agent, an antifogging agent, a lubricant, a pigment, a dye, a plasticizer, an anti-aging agent, a hydrochloric acid absorber, an antioxidant, a crystal nucleating agent, may be added to the propylene-based resin composition of the present invention within the range in which the object of the present invention is not undermined. The amount to be mixed of other components described above in the propylene-based resin composition of the present invention is not particularly limited, as long as the object of the present invention is not undermined.

<Method for Producing Propylene-Based Resin Composition>

The propylene-based resin composition of the present invention can be produced by mixing the components described above. The components may be mixed sequentially in any order or may be mixed simultaneously. Alternatively, a multi-stage method of mixing in which some of the components are mixed and then other components are mixed therewith may be used. However, as described above, the first composition of the present invention is produced by mixing the propylene-based polymer (A) and the propylene·α-olefin copolymer (B) to form a propylene-based block copolymer (C), and then by mixing therewith the ethylene·α-olefin copolymer (D) and if necessary, the inorganic filler (E) and other components. Furthermore, when the propylene-based block copolymer (C) is used for the third composition of the present invention, the third composition is also produced by previously forming the propylene-based block copolymer (C) and then mixing other components therewith.

Examples of methods of mixing the components include a mixing, or melting and kneading the components simultaneously or sequentially using a mixer such as a Banbury mixer, a single screw extruder, a twin screw extruder or a high speed twin screw extruder.

[Molded Article]

The molded article of the present invention is formed of the propylene-based polymer of the present invention or the propylene-based resin composition of the present invention described above. Since the propylene-based polymer of the present invention has unprecedentedly high stereoregularity and high rigidity and high heat resistance, the molded article of the present invention has excellent dimensional stability with small dimensional change due to temperature change. Thus, the molded article of the present invention can be suitably used in various fields including automobile parts, parts for household electric appliances, food containers and medical containers. Examples of the automobile parts include interior and exterior automobile members such as bumpers and instrumental panels, and exterior sheet members such as roofs, door panels and fenders. In particular, the first composition of the present invention is suitable for automobile bumpers, instrumental panels and fenders, the second composition of the present invention is suitable for automobile interior members (e.g., door panels, pillars), and the third composition of the present invention is suitable for automobile functional members (e.g., engine fans, fan shrouds), which are not limited thereto.

Molding methods of the molded article of the present invention are not particularly limited and various known molding methods of polymer may be used. Injection molding and press molding are particularly preferred.

EXAMPLES

Hereinafter the present invention will be described in more detail with reference to Examples, but the present invention is not limited to these Examples. Methods of measurement of physical properties described in Examples are as follows.

<Mesopentad Fraction (Mmmm (Noise Cancellation Method))>

1. Measurement Conditions

Apparatus: AVANCE III cryo-500 type nuclear magnetic resonance spectrometer made by Bruker Biospin Nucleus to be measured: 13C (125 MHz)

Measurement mode: single pulse proton broad band decoupling

Pulse width: 45° (5.00µ seconds)

Repetition time: 5.5 seconds

Cumulative number: 256 times

Solvent for measurement: o-dichlorobenzene/benzene-d6 (80/20% by volume) mixed solvent Concentration of sample: 50 mg/0.6 mL Measurement temperature: 120° C.

Chemical shift standard: 21.59 ppm (mesopentad methyl peak shifts)

2. Method of Calculation

Mesopentad fraction (mmmm, %), which is one of the indicators of stereoregularity of polymers to analyze microtacticity, was calculated from the peak intensity ratio in the $^{13}$C-NMR spectrum obtained in the measurement conditions of 1 above.

Here, in the case of polypropylene having unprecedentedly high stereoregularity, such as the object to be measured in the present invention, the problem is that "noises" have a great impact on the integrated value, if the rmmr, mmrm, rmrr, rmrm, mrrr regions are included in the integrated value, and that S2 in a typical calculation method is overestimated, that is, mmmm (%) is underestimated. Prog. Polym. Sci. 26 (2001), 443-533 also reports that for polypropylene with 95% or more stereoregularity, theoretically the integrated value in rmmr, mmrm, rmrr, rmrm, mrrr regions amounts to 0.1% or less in total, if certain conditions are met, and it is suggested that this leads to the overestimation of S2 in a typical calculation method.

Thus, the mesopentad fraction was calculated by the following (Equation 1). The rmmr, mmrm, rmrr, rmrm, mrrr regions were excluded from calculation based on the suggestion in Prog. Polym. Sci. 26 (2001), 443-533. The method of calculation herein is referred to as a "noise cancellation method" below.

$$mmmm\text{(noise cancellation method)}(\%)=S1/S2*100 \quad \text{(Equation 1)}$$

S1=(peaks including mmmm, mmmr)−(n-propyl terminal)−(n-butyl terminal)−mrrm*2
S2=S1+mmmr+mmrr+mrrm+rrrr
   =S1+5*mrrm+rrrr In the calculation by the above (Equation 1), assignments were as follows in an example. Peaks of mmmr, (n-propyl terminal) and (n-butyl terminal) overlap with those of mmmm.

Peaks including mmmm, mmmr: peak area at 21.2 to 22.0 ppm
mmmr=mrrm*2
mmrr=mrrm*2
mrrm: peak area at 19.5 to 19.7 ppm
rrrr: peak area at 20.0 to 20.2 ppm
n-propyl terminal: (A1+A3)/2
A1: peak area at 14.2 ppm
A3: peak area at 39.4 ppm
n-butyl terminal: peak area at 36.7 ppm
<Average Meso Chain Length>

The average meso chain length Ln (m) was calculated by the following equation.

$$Ln(m)=3+5X/(1-X)$$

X=mmmm (noise cancellation method) (%)/100
<Temperature Rising Elution Fractionation (TREF)>

The amount of a component which elutes at high temperature in TREF, which is considered to be one of the indications of stereoregularity, was calculated from the concentration of polymer which eluted at 122° C. or higher, the concentration being obtained in the temperature rising elution fractionation in the following conditions.

Apparatus: CFC2 type cross fractionation chromatograph made by Polymer Char
Detector: IR4 infrared spectrophotometer (integrated) made by Polymer Char
Mobile phase: o-dichlorobenzene, BHT added
Flow rate: 1.0 mL/minute
Concentration of sample: 90 mg/30 mL
Amount of injection: 0.5 mL
Condition of dissolution: 145° C., 30 minutes
Conditions of stabilization: 135° C., 30 minutes
Temperature dropping rate: 1.0 mL/minute
Fraction of elution: in increments of 10° C. at −20° C. to 0° C., in increments of 5° C. at 0° C. to 80° C., in increments of 3° C. at 80° C. to 104° C., in increments of 2° C. at 104° C. to 126° C.
Time of elution: 3 minutes
<Molecular Weight Distribution>

Mw/Mn values, which are an indicator of molecular weight distribution, were determined by analyzing a chromatogram obtained by measurement in the following conditions according to a known method.

Apparatus: gel permeation chromatograph Alliance GPC2000 made by Waters
Column: TSK gel GMH6-HT×2+TSK gel GMH6-HTL×2 available from Tosoh Corporation
Mobile phase: o-dichlorobenzene (containing 0.025% BHT)
Flow rate: 1.0 ml/minute
Temperature: 140° C.
Calibration column: Monodisperse polystyrene available from Tosoh Corporation
Concentration of sample: 0.15% (w/v)
Amount of injection: 0.4 ml
<Melt Flow Rate (MFR)>

The melt flow rate was measured in accordance with ASTM D1238E. The temperature of measurement was 230° C.

<Amount of Decane-Soluble Component>

About 6 gram of a propylene-based polymer (this weight was designated as b (gram) in the following equation), 500 ml of decane, and a small amount of thermostabilizer soluble in decane were put in a measurement container made of glass. The mixture was stirred under a nitrogen atmosphere with a stirrer, and the temperature was increased to 150° C. in 2 hours to dissolve the propylene polymer. The solution was kept at 150° C. for 2 hours, and then gradually cooled to 23° C. over 8 hours. The resulting liquid containing a precipitate of a propylene polymer was vacuum filtered through a glass filter, 25G-4 standard, made by Iwata Glass Industrial Co., Ltd. 100 mL of the filtrate was collected and dried under reduced pressure to give a portion of the decane-soluble component. This weight was designated as a (gram) in the following equation. After the above process, the amount of the decane-soluble component was determined by the following equation.

$$\text{Content of decane-soluble component (\% by weight)} = 100 \times (500 \times a)/(100 \times b)$$

<Flexural Modulus>

Flexural modulus (MPa) was measured in accordance with ISO 178 in the following conditions.
Temperature: 23° C.
Specimen: 10 mm (width)×4 mm (thickness)×80 mm (length)
Bending speed: 2 mm/minute
Span: 64 mm Example 1

<Preparation of Solid Titanium (a-1)>

The atmosphere in a high speed mixer having an internal volume of 2 liters (made by Tokushu Kika Kogyo Co., Ltd.) was thoroughly replaced with nitrogen, and then 700 ml of purified kerosene, 10 g of magnesium chloride, 24.2 g of ethanol and 3 g of sorbitan distearate ("EMASOL 320" available from KAO Atras) were placed in the mixer. The temperature of the system was increased with stirring and the system was stirred at 120° C. at 800 rpm for 30 minutes. Under high speed stirring the system was transferred to a 2 liter glass flask (equipped with a stirrer) which had been charged with 1 liter of purified kerosene previously cooled to −10° C. using a tube made of Teflon (registered trademark) having an inner diameter of 5 mm. The solid obtained was filtered and thoroughly washed with purified n-hexane to give a solid adduct in which 2.8 moles of ethanol was coordinated with 1 mole of magnesium chloride.

Subsequently, the solid adduct (45 mmol in terms of magnesium atoms) was suspended in 20 ml of decane, and then all of the suspension was added to 195 ml of titanium tetrachloride kept at −20° C. with stirring. The temperature of the mixture was increased to 80° C. over 5 hours, and 1.8 ml (6.2 mmol) of diisobutyl phthalate was added thereto. The temperature was continued to be increased to 110° C., and the mixture was stirred for 1.5 hours.

After completion of the 1.5-hour reaction, the solid portion was collected by hot filtration, and washed with decane at 100° C. and hexane at room temperature until no titanium was detected in the filtrate. Thus, solid titanium (a-1) containing 3.8% by weight of titanium, 16% by weight of magnesium, 18.2% by weight of diisobutyl phthalate and 1.1% by weight of ethanol residue was prepared.

<Preparation of Solid Titanium Catalyst Component (i-1)>

6.8 g of the solid titanium (a-1) obtained, 113 ml of paraxylene, 11 ml of decane, 2.5 ml (23 mmol) of titanium tetrachloride and 0.34 ml (1.2 mmol) of diisobutyl phthalate were placed in a 200 ml reactor made of glass whose atmosphere was thoroughly replaced with nitrogen. The temperature of the reactor was increased to 130° C., and the mixture was stirred at the temperature for 1 hour to bring the components into contact with each other, and the solid portion was collected by hot filtration. The solid portion was re-suspended in 101 ml of paraxylene, and 1.7 ml (15 mmol) of titanium tetrachloride and 0.22 ml (0.8 mmol) of diisobutyl phthalate were added thereto.

Then the temperature was increased to 130° C., and while maintaining the temperature, the mixture was stirred for 1 hour to perform the reaction. After completion of the reaction, solid-liquid separation was performed by hot filtration again. The resulting solid portion was washed with decane at 100° C. and hexane at room temperature until the amount of paraxylene was 1% by weight or less in the catalyst. Thus, solid titanium catalyst component (i-1) containing 1.3% by weight of titanium, 20% by weight of magnesium and 13.8% by weight of diisobutyl phthalate was prepared.

<Main Polymerization>

0.35 mmol of triethylaluminum, 0.07 mmol of cyclopentyl diethylamino dimethoxysilane, and 0.0028 mmol in terms of titanium atoms of the solid titanium catalyst component (i-1) obtained were placed in a 30 ml glass container in which 7 ml of heptane was placed. The components were brought into contact with each other at 20° C. for 10 minutes to give a catalyst for olefin polymerization. Subsequently, the above catalyst for olefin polymerization was placed in an autoclave having an internal volume of 2 liters in which 500 g of propylene was placed to perform polymerization at 20° C. for 10 minutes. Then, 10 liters of hydrogen was added thereto and the temperature of the system was increased to 70° C. to perform polymerization for 1 hour. Subsequently, ethanol was added thereto to stop polymerization and unreacted propylene was purged to give 371 g of polypropylene (A-1). The results of evaluation of physical properties of the resulting polypropylene (A-1) are shown in Table 1.

Example 2

Example 2 was performed in the same manner as in Example 1 except for changing the amount of hydrogen added in the main polymerization from 10 liters to 7.5 liters. The results of evaluation of physical properties of the resulting polypropylene (A-2) are shown in Table 1.

Example 3

<Main Polymerization>

0.35 mmol of triethylaluminum, 0.07 mmol of cyclopentyl diethylamino dimethoxysilane, 0.35 mmol of diethylzinc and 0.0028 mmol in terms of titanium atoms of the solid titanium catalyst component (i-1) prepared in Example 1 above were placed in a 30 ml glass container in which 7 ml of heptane was placed. The components were brought into contact with each other at 20° C. for 10 minutes to give a catalyst for olefin polymerization. Subsequently, the above catalyst for olefin polymerization was placed in an autoclave having an internal volume of 2 liters in which 500 g of propylene was placed to perform polymerization at 20° C. for 10 minutes. Then, 16 liters of hydrogen was added thereto and the temperature of the system was increased to 60° C. to perform polymerization for 1 hour. Subsequently, ethanol was added thereto to stop polymerization and unreacted propylene was purged to give 279 g of polypropylene (A-3). The results of evaluation of physical properties of the resulting polypropylene (A-3) are shown in Table 1.

Example 4

Example 4 was performed in the same manner as in Example 3 except for changing the amount of diethylzinc added in the main polymerization from 0.35 mmol to 0.7 mmol. The results of evaluation of physical properties of the resulting polypropylene (A-4) are shown in Table 1.

Example 5

Example 5 was performed in the same manner as in Example 3 except for changing the amount of hydrogen added in the main polymerization from 16 liters to 12.5 liters and the amount of diethylzinc added in the main polymerization from 0.35 mmol to 2.8 mmol. The results of evaluation of physical properties of the resulting polypropylene (A-5) are shown in Table 1.

Example 6

<Preparation of Pre-Polymerization Catalyst (p-1)>

50 ml of hexane, 2.5 mmol of triethylaluminum, 0.5 mmol of cyclopentyl diethylamino dimethoxysilane and 0.25 mmol in terms of titanium atoms of the solid titanium catalyst component (1-1) prepared in Example 1 were placed in a 200 ml reactor made of glass whose atmosphere was replaced with nitrogen. Then propylene was supplied thereto in an amount of 1.47 liters/hour for 1 hour while maintaining the temperature of the system at 20° C. This procedure gave pre-polymerization catalyst (p-1) in which 3 g of propylene was pre-polymerized per 1 g of the solid titanium catalyst component (i-1).

<Main Polymerization>

500 g of propylene and 7.5 liters of hydrogen were placed in an autoclave having an internal volume of 2 liters, and the temperature of the system was increased to 60° C. Subsequently, 0.7 mmol of triethylaluminum, 0.7 mmol of cyclopentyl diethylamino dimethoxysilane and 0.0028 mmol in terms of titanium atoms of the pre-polymerization catalyst (p-1) prepared above were added thereto to start polymerization. The polymerization was performed for 1 hour while maintaining the temperature of the system at 70° C. Subsequently, ethanol was added thereto to stop polymerization and unreacted propylene was purged to give 286 g of polypropylene (A-6). The results of evaluation of physical properties of the resulting polypropylene (A-6) are shown in Table 1.

Example 7

Example 7 was performed in the same manner as in Example 6 except for changing the amount of hydrogen added from 7.5 liters to 11.5 liters. The results of evaluation of physical properties of the resulting polypropylene (A-7) are shown in Table 1.

Comparative Example 1

Comparative Example 1 was performed in the same manner as in Example 1 except for using dicyclopentyl dimethoxysilane instead of cyclopentyl diethylamino dimethoxysilane used in the main polymerization and changing the amount of hydrogen added from 10 liters to 7.5 liters. The results of evaluation of physical properties of the resulting polypropylene (a-1) are shown in Table 1.

Comparative Example 2

Comparative Example 2 was performed in the same manner as in Example 1 except for using cyclohexylmethyl dimethoxysilane instead of cyclopentyl diethylamino dimethoxysilane used in the main polymerization and changing the amount of hydrogen added from 10 liters to 4.5 liters. The results of evaluation of physical properties of the resulting polypropylene (a-2) are shown in Table 1.

Comparative Example 3

Comparative Example 3 was performed in the same manner as in Example 1 except for using diisopropyl dimethoxysilane instead of cyclopentyl diethylamino dimethoxysilane used in the main polymerization and changing the amount of hydrogen added from 10 liters to 4.0 liters. The results of evaluation of physical properties of the resulting polypropylene (a-3) are shown in Table 1.

Comparative Example 4

Comparative Example 4 was performed in the same manner as in Example 1 except for using 2-isobutyl-2-isopropyl-1,3-dimethoxypropane instead of cyclopentyl diethylamino dimethoxysilane used in the main polymerization and changing the amount of hydrogen added from 10 liters to 2.0 liters. The results of evaluation of physical properties of the resulting polypropylene (a-4) are shown in Table 1.

Comparative Example 5

<Preparation of Solid Titanium Catalyst Component (ci-1)>

95.2 g of anhydrous magnesium chloride, 442 ml of decane and 390.6 g of 2-ethylhexyl alcohol were heated and reacted at 130° C. for 2 hours to give a homogenous solution. Then 22.2 g of phthalic anhydride was added to the solution, and the mixture was mixed with stirring at 130° C. for 1 hour to dissolve phthalic anhydride. The homogeneous solution obtained as described above was cooled to room temperature, and then 75 ml of the homogenous solution was added dropwise to 200 ml of titanium tetrachloride kept at −20° C. over 1 hour. After the addition, the temperature of the mixture was increased to 110° C. over 4 hours. When the temperature reached 110° C., 5.22 g of diisobutyl phthalate was added thereto, and the mixture was kept at the same temperature for 2 hours with stirring. Subsequently, the solid portion was collected by hot filtration and the solid portion was re-suspended in 275 ml of titanium tetrachloride. Then the suspension was heated and reacted again at 110° C. for 2 hours. After completion of the reaction, the solid portion was collected again by hot filtration, and washed thoroughly with decane and hexane at 110° C. until no free titanium compound was detected in the solution. Thus, solid titanium catalyst component (ci-1) containing 2.3% by weight of titanium, 20.0% by weight of magnesium and 10.2% by weight of diisobutyl phthalate was prepared.

<Main Polymerization>

Main polymerization was performed in the same manner as in Example 1 except for using the solid titanium catalyst component (ci-1) instead of the solid titanium catalyst component (i-1) and changing the amount of hydrogen added from 10 liters to 6.5 liters. The results of evaluation of physical properties of the resulting polypropylene (a-5) are shown in Table 1.

Comparative Example 6

Comparative Example 6 was performed in the same manner as in Comparative Example 5 except for using dipyrrolidyl dimethoxysilane instead of cyclopentyl diethylamino dimethoxysilane used in the main polymerization and changing the amount of hydrogen added from 6.5 liters to 4.5 liters. The results of evaluation of physical properties of the resulting polypropylene (a-6) are shown in Table 1.

Comparative Example 7

Comparative Example 7 was performed in the same manner as in Example 1 except for using diethylamino triethoxysilane instead of cyclopentyl diethylamino dimethoxysilane used in the main polymerization and changing the amount of hydrogen added from 10 liters to 1.8 liters. The results of evaluation of physical properties of the resulting polypropylene (a-7) are shown in Table 1.

Comparative Example 8

Comparative Example 8 was performed in the same manner as in Example 6 except for using diethylamino triethoxysilane instead of cyclopentyl diethylamino dimethoxysilane used in the main polymerization and changing the amount of hydrogen added from 7.5 liters to 1.0 liter. The results of evaluation of physical properties of the resulting polypropylene (a-8) are shown in Table 1.

Comparative Example 9

Comparative Example 9 was performed in the same manner as in Comparative Example 8 except for changing the amount of hydrogen added from 1.0 liter to 5.0 liters.

The results of evaluation of physical properties of the resulting polypropylene (a-9) are shown in Table 1.

Comparative Example 10

Comparative Example 10 was performed in the same manner as in Comparative Example 8 except for changing the amount of hydrogen added from 1.0 liter to 7.0 liters. The results of evaluation of physical properties of the resulting polypropylene (a-10) are shown in Table 1.

<Conditions of Melt-Kneading>
Parallel twin screw kneader: Item No. KZW-15 made by Technovel Corporation
Temperature of kneading: 190° C.
Rotation number of screw: 500 rpm
Rotation number of feeder: 40 rpm
<Conditions of injection molding>
Injection molding machine: EC40 (trade name, made by Toshiba Machine Co., Ltd.)
Temperature of cylinder: 190° C.

TABLE 1

| | Polypropylene | Catalyst for olefin polymerization | | Amount of $H_2$ [L] | Polymerization activity [kg/g-cat] | Average meso chain length | Amount of component eluting in TREF [wt %] | MFR [g/10 min] | mmmm [%] | Amount on decane-soluble component [wt %] | Mw/Mn |
|---|---|---|---|---|---|---|---|---|---|---|---|
| | | Solid titanium catalyst component | External donor | | | | | | | | |
| Example 1 | A-1 | i-1 | ii-1 | 10.0 | 35.1 | 2498 | 15.6 | 32 | 99.8 | 0.58 | 7.9 |
| Example 2 | A-2 | i-1 | ii-1 | 7.5 | 32.8 | 1665 | 26.8 | 17 | 99.7 | 0.53 | 7.8 |
| Example 3 | A-3 | i-1 | ii-1 | 16.0 | 20.0 | 1665 | 10.5 | 163 | 99.7 | 1.21 | 7.2 |
| Example 4 | A-4 | i-1 | ii-1 | 16.0 | 20.8 | 1248 | 7.1 | 218 | 99.6 | 1.08 | 6.8 |
| Example 5 | A-5 | i-1 | ii-1 | 12.5 | 16.7 | 1665 | 0.32 | 442 | 99.7 | 0.86 | 5.1 |
| Example 6 | A-6 | i-1 | ii-1 | 7.5 | 26.3 | 4998 | 24.8 | 15 | 99.9 | 0.37 | 8.4 |
| Example 7 | A-7 | i-1 | ii-1 | 11.5 | 20.0 | 2498 | 19.2 | 28 | 99.8 | 0.51 | 7.8 |
| Comparative Example 1 | a-1 | i-1 | cii-1 | 7.5 | 40.0 | 712 | 11.1 | 27 | 99.3 | 0.39 | 6.4 |
| Comparative Example 2 | a-2 | i-1 | cii-2 | 4.5 | 23.0 | 331 | 0.5 | 33 | 98.5 | 0.72 | 5.5 |
| Comparative Example 3 | a-3 | i-1 | cii-3 | 4.0 | 36.4 | 623 | 8.3 | 29 | 99.2 | 0.43 | 5.8 |
| Comparative Example 4 | a-4 | i-1 | cii-4 | 2.0 | 24.4 | 331 | 0.5 | 34 | 98.5 | 0.49 | 4.6 |
| Comparative Example 5 | a-5 | ci-1 | ii-1 | 6.5 | 27.0 | 453 | 13.7 | 35 | 98.9 | 1.27 | 9.0 |
| Comparative Example 6 | a-6 | ci-1 | cii-5 | 4.5 | 18.2 | 415 | 15.9 | 24 | 98.8 | 0.67 | 6.5 |
| Comparative Example 7 | a-7 | i-1 | cii-6 | 1.8 | 25.3 | 712 | 11.9 | 30 | 99.3 | 0.39 | 4.6 |
| Comparative Example 8 | a-8 | i-1 | cii-6 | 1.0 | 18.2 | 383 | 13.4 | 12 | 98.7 | 0.64 | 5.3 |
| Comparative Example 9 | a-9 | i-1 | cii-6 | 5.0 | 26.7 | 712 | 0.4 | 231 | 99.3 | 0.67 | 4.4 |
| Comparative Example 10 | a-10 | i-1 | cii-6 | 7.0 | 25.6 | 623 | 1.1 | 441 | 99.2 | 0.94 | 4.4 |

The meaning of symbols for the "external donor" in the "catalyst for olefin polymerization" in Table 1 are as follows.
ii-1: cyclopentyl diethylamino dimethoxysilane
cii-1: dicyclopentyl dimethoxysilane
cii-2: cyclohexylmethyl dimethoxysilane
cii-3: diisopropyl dimethoxysilane
cii-4: 2-isobutyl-2-isopropyl-1,3-dimethoxypropane
cii-5: dipyrrolidyl dimethoxysilane
cii-6: diethylamino triethoxysilane Examples 8 to 10 and Comparative Examples 11 to 13

The polypropylene prepared in Examples or Comparative Examples described above, and nucleating agent (F) or inorganic fiber (G) were mixed so as to obtain the composition shown in Table 2 (only the polypropylene was used in Example 8 and Comparative Example 11). Then the mixture was melt-kneaded in a twin screw extruder in the following conditions to give a propylene-based resin composition in the form of pellets. The resulting pellets were injection-molded by an injection molding machine in the following conditions to prepare a specimen. Physical properties of the injection molded article (specimen) obtained are shown in Table 2.

Temperature of mold: 40° C.
Injection time-holding time: 13 seconds
Time of cooling: 15 seconds Examples 11 to 12 and Comparative Examples 14 to 16

First, polypropylene and propylene•α-olefin copolymer (B) were mixed in the amount shown in Table 2, and then the mixture was melt-kneaded with a twin screw extruder in the following conditions to give a propylene-based block copolymer. Next, ethylene•α-olefin copolymer (D) and inorganic filler (E) were mixed with the resulting propylene-based block copolymer in the amount shown in Table 2, and the mixture was melt-kneaded with the twin screw extruder in the following conditions to give a propylene-based resin composition in the form of pellets. The resulting pellets were injection-molded by an injection molding machine in the following conditions to prepare a specimen. Physical properties of the injection molded article (specimen) obtained are shown in Table 2.
<Conditions of Melt-Kneading>
Parallel twin screw kneader: Item No. KZW-15 made by Technovel Corporation
Temperature of kneading: 190° C.

Rotation number of screw: 500 rpm
Rotation number of feeder: 40 rpm
<Conditions of Injection Molding>
Injection molding machine: EC40 (trade name, made by Toshiba Machine Co., Ltd.)
Temperature of cylinder: 190° C.
Temperature of mold: 40° C.
Injection time-holding time: 13 seconds
Time of cooling: 15 seconds.

TABLE 2

| | Polypropylene | | Copolymer | Copolymer | Inorganic | Nucleating | Inorganic | Physical properties |
| | | | | | | | | Flexural |
| | Type | MFR (g/10 min) | Amount mixed | (B) B-1 | (D) D-1 | filler (E) E-1 | agent (F) F-1 | fiber (G) G-1 | module MPa |
|---|---|---|---|---|---|---|---|---|---|
| Example 8 | A-5 | 442 | 100 | — | — | — | — | — | 1850 |
| Comparative Example 11 | a-10 | 441 | 100 | — | — | — | — | — | 1770 |
| Example 9 | A-4 | 218 | 100 | — | — | — | 0.3 | — | 2420 |
| Comparative Example 12 | a-9 | 231 | 100 | — | — | — | 0.3 | — | 2310 |
| Example 10 | A-2 | 17 | 90 | — | — | — | — | 10 | 2940 |
| Comparative Example 13 | a-8 | 12 | 90 | — | — | — | — | 10 | 2690 |
| Example 11 | A-4 | 218 | 39 | 5 | 21 | 35 | — | — | 2430 |
| Comparative Example 14 | a-9 | 231 | 39 | 5 | 21 | 35 | — | — | 2340 |
| Example 12 | A-7 | 28 | 54 | 5 | 21 | 20 | — | — | 1960 |
| Comparative Example 15 | a-6 | 24 | 54 | 5 | 21 | 20 | — | — | 1860 |
| Comparative Example 16 | a-7 | 30 | 54 | 5 | 21 | 20 | — | — | 1830 |

The meaning of symbols for components (B) and (D) to (G) in Table 2 are as follows.

B-1: propylene• ethylene copolymer (trade name: TAFMER S4020 available from Mitsui Chemicals Inc.)

D-1: ethylene• butene copolymer (trade name: TAFMER A1050S available from Mitsui Chemicals Inc.)

E-1: talc (trade name: JM209 available from Asada Milling Co., Ltd.)

F-1: phosphate nucleating agent (trade name: Adekastab NA-11 available from ADEKA CORPORATION)

G-1: basic magnesium sulfate inorganic fiber (trade name MOSHIGE A available from Ube Material Industries)

The invention claimed is:

1. A propylene-based polymer (A) which satisfies the following requirements (1) to (4):
   (1) an average meso chain length is 800 to 100,000 for the propylene-based polymer (A);
   (2) a melt flow rate (MFR) (ASTM D1238, 230° C., under a load of 2.16 kg) is 0.5 to 1,000 g/10 minutes;
   (3) a ratio of weight average molecular weight (Mw) to number average molecular weight (Mn), Mw/Mn, as measured by gel permeation chromatography (GPC) is 4.2 to 20; and
   (4) when a ratio of a component which elutes at a temperature of 122° C. or more as measured by temperature rising elution fractionation (TREF) of all components is A % by weight and the melt flow rate of the requirement (2) is B g/10 minutes, A and B satisfy the following formula (I):

$$100 \geq A \geq 20 \times \mathrm{EXP}(-0.01 \times B) \quad \text{(I)}.$$

2. A propylene-based polymer (A) which satisfies the following requirements (1) to (5):
   (1) an average meso chain length is 800 to 100,000 for the propylene-based polymer (A);
   (2) a melt flow rate (MFR) (ASTM D1238, 230° C., under a load of 2.16 kg) is 0.5 to 1,000 g/10 minutes;
   (3) a ratio of weight average molecular weight (Mw) to number average molecular weight (Mn), Mw/Mn, as measured by gel permeation chromatography (GPC) is 4.2 to 20;
   (4) when a ratio of a component which elutes at a temperature of 122° C. or more as measured by temperature rising elution fractionation (TREF) of all components is A % by weight and the melt flow rate of the requirement (2) is B g/10 minutes, A and B satisfy the following formula (I):

$$100 \geq A \geq 20 \times \mathrm{EXP}(-0.01 \times B) \quad \text{(I); and}$$

(5) an amount of a component soluble in n-decane at 23° C. is 0.01 to 2% by weight.

3. A method for producing the propylene-based polymer (A) according to claim 1, the method comprising polymerizing propylene in the presence of a catalyst for olefin polymerization,
   wherein the catalyst for olefin polymerization is catalyst [A] comprising:
   (i) a solid titanium catalyst component which comprises magnesium, titanium, halogen and an electron donor, and satisfies the following requirements (k1) to (k4),
   (ii) an organosilicon compound component represented by the following formula (II) and
   (iii) an organometallic compound component comprising an element of group 1, group 2 or group 13 in the periodic table, or
   catalyst [B] comprising:
   a pre-polymerization catalyst (p) in which propylene is pre-polymerized with the catalyst [A], the organosilicon compound component (ii) and the organometallic compound component (iii);

(k1) a titanium content is 2.5% by weight or less,
(k2) an electron donor content is 8 to 30% by weight,
(k3) an electron donor/titanium weight ratio is 7 or more, and
(k4) substantially no titanium desorbs when washed with hexane at room temperature;

$$R^1Si(OR^2)_2(NR^3R^4) \qquad (II)$$

wherein $R^1$ represents a secondary or tertiary hydrocarbon group having 1 to 20 carbon atoms, $R^2$ represents a hydrocarbon group having 1 to 4 carbon atoms, $R^3$ represents a hydrocarbon group having 1 to 12 carbon atoms or a hydrogen atom, and $R^4$ represents a hydrocarbon group having 1 to 12 carbon atoms.

4. The method for producing the propylene-based polymer (A) according to claim 3,
wherein the solid titanium catalyst component (i) is produced by a method comprising the step of bringing, into contact with each other,
(a) solid titanium which comprises magnesium, titanium, halogen and an electron donor, wherein titanium does not desorb when washed with hexane at room temperature,
(b) an aromatic hydrocarbon,
(c) liquid titanium and
(d) an electron donor.

5. A propylene-based resin composition comprising:
20 to 80% by mass of a propylene-based block copolymer (C) comprising a propylene homopolymer unit and a propylene •α-olefin copolymer unit,
1 to 50% by mass of an ethylene •α-olefin copolymer (D) comprising 50 to 95% by mole of a structural unit derived from ethylene and 5 to 50% by mole of a structural unit derived from α-olefin having 3 to 20 carbon atoms, and
0 to 70% by mass of an inorganic filler (E),
the total amount of the components (C), (D) and (E) being 100% by mass,
wherein the propylene-based block copolymer (C) comprises:
60 to 99% by mass of the propylene-based polymer (A) according to claim 1 as the propylene homopolymer unit, and
1 to 40% by mass of a propylene •α-olefin copolymer (B) comprising 55 to 90% by mole of a structural unit derived from propylene and 10 to 45% by mole of a structural unit derived from α-olefin having 2 to 20 carbon atoms other than propylene as the propylene •α-olefin copolymer unit,
the total amount of the components (A) and (B) being 100% by mass.

6. A propylene-based resin composition comprising:
100 parts by mass of the propylene-based polymer (A) according to claim 1 and
0.01 to 10 parts by mass of a nucleating agent (F).

7. A propylene-based resin composition comprising:
70 to 99.5% by mass of at least one component selected from the group consisting of the propylene-based polymer (A) according to claim 1 and a propylene-based block copolymer (C) comprising a propylene homopolymer unit and a propylene •α-olefin copolymer unit, and
0.5 to 30% by mass of an inorganic fiber (G),
the total amount of the components (A), (C) and (G) being 100% by mass,
wherein the propylene-based block copolymer (C) comprises:
60 to 99% by mass of the propylene-based polymer (A) according to claim 1 as the propylene homopolymer unit, and
1 to 40% by mass of a propylene •α-olefin copolymer (B) comprising 55 to 90% by mole of a structural unit derived from propylene and 10 to 45% by mole of a structural unit derived from α-olefin having 2 to 20 carbon atoms other than propylene as the propylene •α-olefin copolymer unit,
the total amount of the components (A) and (B) being 100% by mass.

8. A molded article comprising the propylene-based polymer according to claim 1.

9. A molded article formed of the propylene-based resin composition according to claim 5.

* * * * *